United States Patent [19]

Taborsky

[11] 4,038,945

[45] Aug. 2, 1977

[54] BREEDING TANK

[76] Inventor: Jiri Taborsky, R.R. No. 1, Box 430 D-2, Palmetto, Fla. 33561

[21] Appl. No.: 709,969

[22] Filed: July 30, 1976

[51] Int. Cl.$^2$ .............................................. A01K 64/00
[52] U.S. Cl. ...................................................... 119/3
[58] Field of Search ........................................ 119/2-5; 210/169

[56] References Cited

U.S. PATENT DOCUMENTS

| 148,035 | 3/1874 | Clark | 119/3 |
|---|---|---|---|
| 3,086,497 | 4/1963 | Novello | 119/2 |
| 3,116,712 | 1/1964 | Ogden et al. | 119/2 X |
| 3,140,691 | 9/1964 | Stark | 119/5 |
| 3,166,043 | 1/1965 | Castillo | 119/3 |
| 3,225,736 | 12/1965 | Willinger et al. | 119/5 |
| 3,255,731 | 6/1966 | Girard | 119/3 |
| 3,638,616 | 2/1972 | Carmouche | 119/3 X |
| 3,658,034 | 4/1972 | Day et al. | 119/2 |
| 3,797,458 | 3/1974 | Day et al. | 119/2 |

Primary Examiner—J.N. Eskovitz
Attorney, Agent, or Firm—Stefan M. Stein; Robert F. Frijouf

[57] ABSTRACT

A breeding facility for fish and like marine life comprising a plurality of intercommunicating tanks arranged in interconnected relation to one another in a predetermined relation so as to establish a successive flow or path of travel of marine life through each of a predetermined number of the tanks. An interconnector access apertures and flow regulator are mounted or connected in corresponding and predetermined location relative to the access apertures of each of the tanks such that these tanks may be selectively opened for fluid communication therebetweeen or closed off to prohibit flow of marine life therebetween. One or more of the tanks may have specific strengthening member, and specific configurations to provide ready access between the tanks, drainage of the tanks when desired and permanent or temporary disposition of the tanks in a stacked or non-stacked relation to one another. Supplementary containers may be mounted within one or more of the tanks to allow for separation of live breeding adult fish from the fry after birth and further separation of the fry and/or adult fish through the cooperative structure of the supplementary container and the flow regulator which allows flow of the marine life between tanks in a single direction only. One or more of the containers are further adapted to have collectors attached thereto for gathering of either the adult breeders or the resulting fry from live breeders or hatched eggs.

27 Claims, 9 Drawing Figures

U.S. Patent    Aug. 2, 1977    Sheet 1 of 2    4,038,945
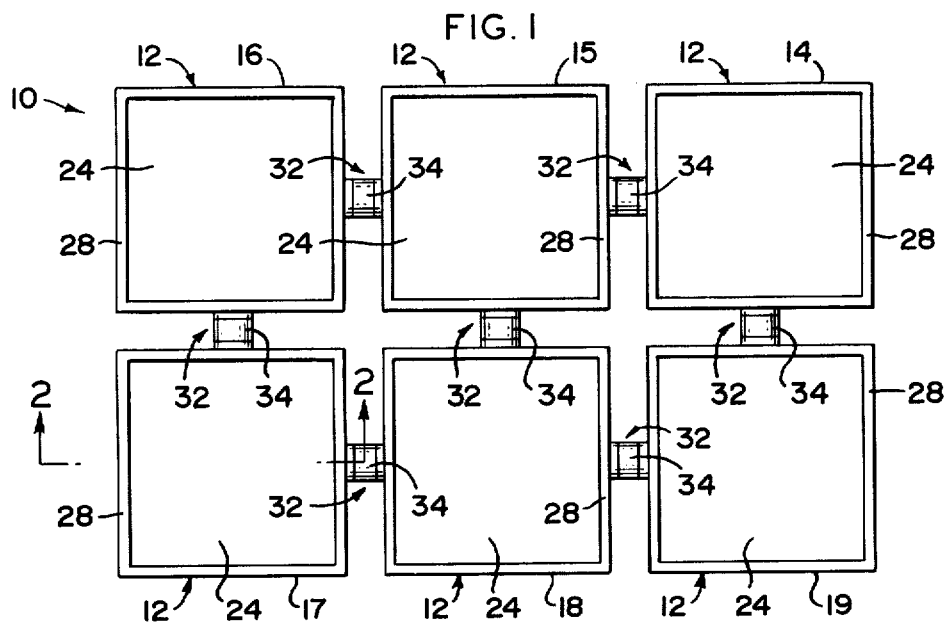
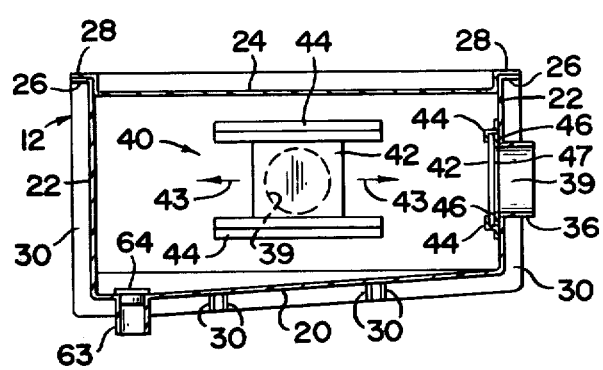
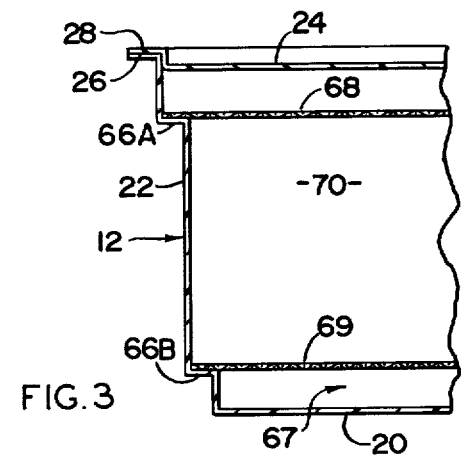
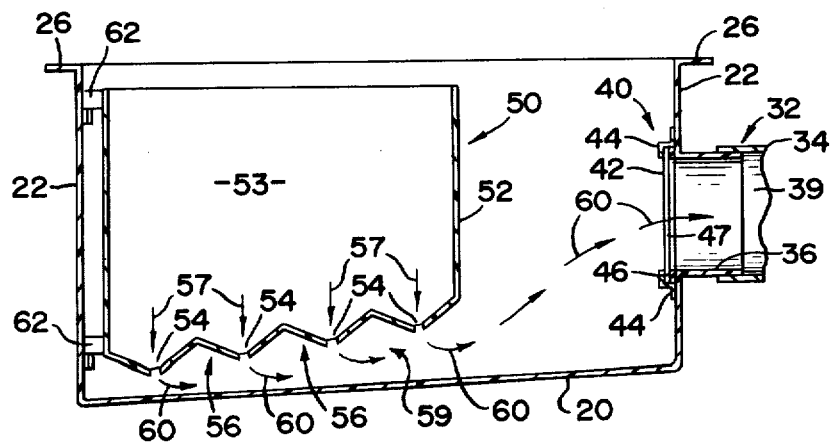

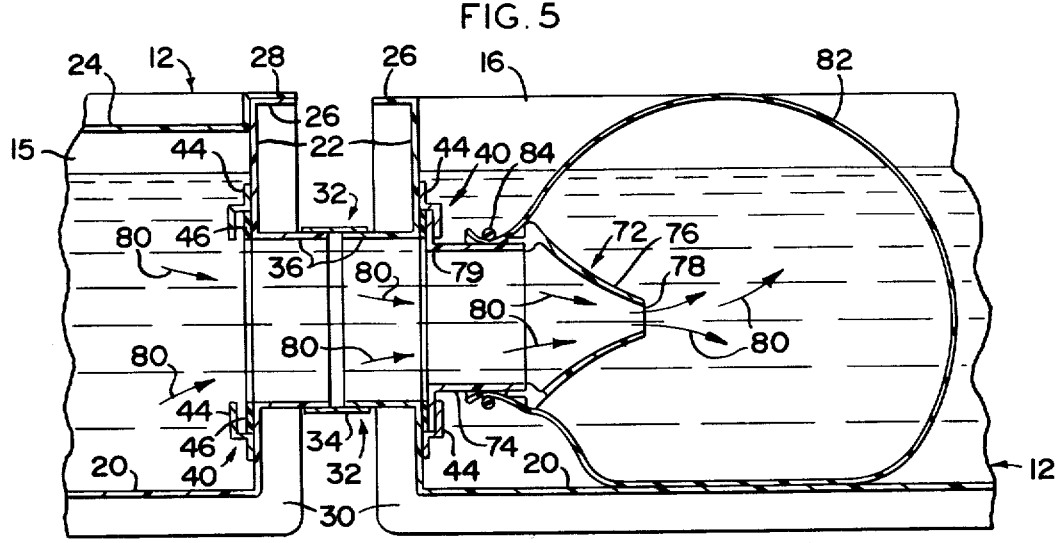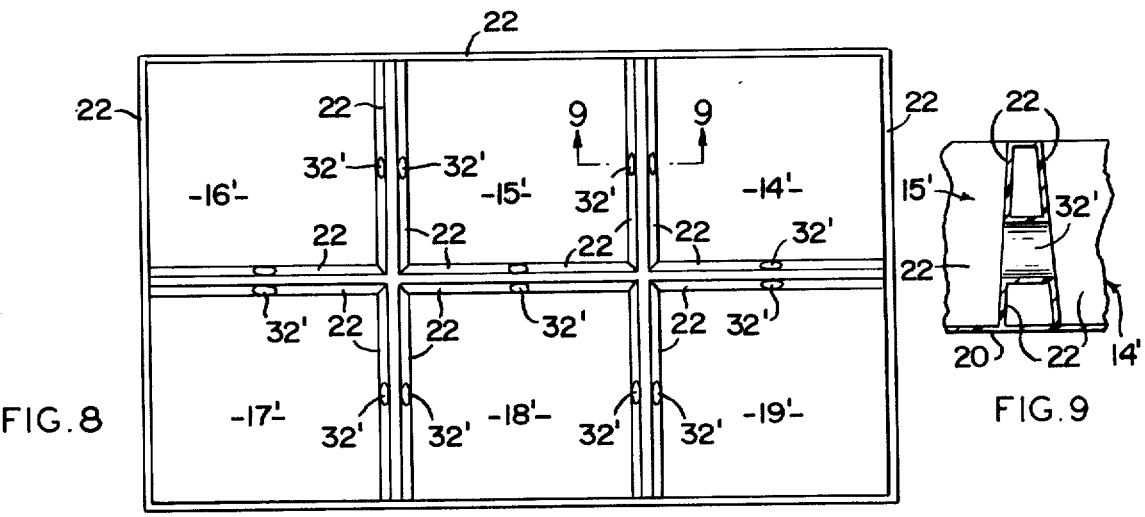

BREEDING TANK

BACKGROUND OF THE INVENTION

1. Field of the Invention

This invention relates to a breeding facility used for the mass breeding of fish, commonly referred to as tropical fish or other marine life wherein a minimal amount of individual handling of the fish is accomplished through the controlled flow or passage of the fish through each or predetermined successively arranged tank means.

2. Description of the Prior Art

Present day breeding procedures for tropical or ornamental fish utilized on fish farms and like facilities commonly suffer from problems and disadvantages basically concerned with the extensive use of skilled labor, large space requirements and the utilization of time consuming techniques and procedures which result in relatively low yield as well as a limitation on the type of fish which can be domestically produced. When considering the breeding process of 1000 breeder units, the following techniques are frequently used in todays breeding facilities.

Breeders are commonly held in holding tanks which usually have approximately a 20 to 30 gallon capacity. One thousand breeding units require at least eighty holding tanks which, in turn, requires a relatively large amount of space or land being utilized in current day fish farms. The male and female breeders are held in separate tanks. The average number of fish in each holding tank is approximately 30 but will, of course, vary depending on size and/or species.

Since female breeders have individual ovulation cycles, it is necessary to determine which females are actually in ovulation. This determination can be made commercially only from the appearance of the female and it is generally impossible to make more than an educated estimate that the female is actually ready to spawn. This is not only time consuming but requires a person highly skilled in the knowledge of various species of fish to make an accurate determination. The condition of the breeders are examined by the one or more skilled operators required, and they are then removed from the holding tank with a net or like collecting device. The collected breeders are placed in a container temporarily until they are removed again with a net or like collecting device to respective breeding tanks where breeding actually takes place. The general or conventional capacity of these tanks is approximately five gallons in size.

The breeder unit, under proper conditions and depending upon the species, should normally start to spawn within 12 to 48 hours. Each breeder tank must be checked two or three times daily to see if spawning has actually occurred. As soon as spawning is completed, the breeding unit must be removed from the breeding tank to prevent cannibalism. This is done again, with a net or like collecting device, whereby the breeder unit is put in a temporary holding container and then back into the relatively permanent holding tank. The breeders are handled at least four times in each breeding cycle.

After the larva are hatched they attach themselves on the walls of the tank or in spawning substrata or lie on the bottom. When the fry are swimming and able to eat, the spawning substrata must be removed. At this point, most of the water is removed by a siphon with a sponge or similar filter means attached to prevent the fry from being removed along with the drainage water. Fry that are actually sucked against the sponge or filter means are frequently damaged resulting in a relatively low yield of healthy fish. The tank must be removed from the rack or container and the remaining water in the fry poured into a plastic bag and transferred to a maturing facility. This procedure must be repeated with each tank or approximately with one thousand tanks considering one thousand breeder units in a breeding cycle.

As set forth above, there are common disadvantages associated with the prior art and/or currently used system and facilities. Namely, only a portion of the female breeders will be put in the spawning tanks at the right time due to factors which are generally uncontrollable. Such factors include the fact that females not in ovulation will not spawn, females mated after ovulation will not be fertilized, and other commonly known but generally uncontrollable occurences. Fungi and protozoa spores are present in all water, but healthy eggs are able to repel them. White eggs, or eggs produced by breeders which are not fertilized, require incubation and are not able to repel such spores. Fungi and protozoa then attack the good eggs. In addition, it is a common occurence in some species that a female, not spawned in her ovulation period is not able to discharge or absorb the eggs and they become obstructed within the female. This prevents her from breeding, and eventually will cause death.

In addition, if the female is not in ovulation and does not want to spawn, the male may kill her in a small tank because there is no room for her to escape. An example of such species in which this cmmonly occurs is *Barbus tetrazona*. Some males may not be stimulated to spawn and some may be impotent. Since this is impossible to detect, a spawning cycle in an individual tank will be fruitless, thereby wasting both time and space. A common occurence in some species is the requirement of a female to be combined with more than one male for mating. In certain species a female will spawn only for a few hours and it will be days before she will spawn again. Any males combined with this female when she is not in the spawning period are wasted for the whole spawning period except for these few hours. This requires maintaining a five to one male to female ratio constantly over a prolonged period of time thereby wasting space, time and the breeders themselves. Similarly, with many fish, two males are used with one female just to insure the fertilization of all eggs, especially if the males are smaller than the females. This requires a general ratio of two to one males which, again, is often a waste of breeders as well as time and space.

Most fish are not fed in breeding tanks. One of the best foods is plankton, but it is generally too dangerous to use in a small tank operation because many species will attack the hanging larva and the fry. Frozen and dry food will sour and cause a build up of bacteria and protozoa which attack the eggs thereby reducing the usable yield. The use of filters is generally too costly for a large number of breeding tanks. The only other possible foods are Tubifex and Enchytreus but they are generally too expensive, both in purchasing cost and the labor necessary for distribution. Consequently, the fish in breeding tanks are frequently hungry which encourages cannibalism and, again, loss of usable yield for the breeders themselves.

A very important disadvantage in currently used facilities and procedures is the frequent handling required of the breeders themselves. As set forth above, the breeders in a common cycle must be handled at least four times which is very frequently harmful to the fish. Because of the mortality rate due to the frequent handling of such fish a large breeder reserve must be maintained in order to operate a successful farm with a reasonable yield production. This breeder reserve often must be 20% or greater.

Another large, single disadvantage commonly occuring with current day breeding facilities is the quality and quantity of labor required. The old prior art facilities and procedures requires at least one highly qualified person with knowledge of the physiology and ecology of fish in order to sex the breeder, make optimum estimate of ovulation period, recognize fish diseases, know when spawning is completed and also realize when the fry should be removed. In addition, two responsible people with common knowledge of fish such as being able to recognize species and common fish diseases are also required for handling and periodic checking. Transferring of breeders and/or tanks requires an additional two or three laborers per thousand breeding tank cycle. Again, for the quantity of breeders and facilities set forth above, approximately 100 hours are utilized in both skilled and semi-skilled labor with current breeding methods.

Accordingly, there is an obvious need in the ornamental fish breeding industry for both facilities and techniques requiring much less utilization of both skilled and semi-skilled labor as well as physical facilities requiring much less space, etc. In order to overcome the current disadvantages, such a system should ideally take advantage of nature's provision for breeding fish such as breeding fish in large "schools" wherein specific ratios required are eliminated, manual handling of the fish is reduced or completely eliminated and a minimal amount of time is required for checking or observation by a highly skilled attendant.

SUMMARY OF THE INVENTION

This invention relates to a breeding facility structurally designed to take advantage of the breeding habits of marine life including tropical fish when these fish exist in their natural habitats. More specifically, the invention comprises a plurality of tank means fixedly or removably interconnected to one another to define a predetermined flow path or path of travel of the fish between the various plurality of tanks. Interconnecting means in the form of hollow conduits having opposite ends open are removably or fixedly interconnected between adjacently positioned tank means. More particularly, a single tank means may be connected to one or more of the adjacently positioned tank means so as to add versatility when selecting a predetermined flow path of the marine life therein. This is the obvious advantage of one embodiment of the present invention wherein the interconnecting means may be removably connected between preselected ones of the various tank means.

Correspondingly, one or more access means are formed on the side walls of each tank means and configured to allow interconnection between the access means and the interconnecting conduit. The access means further includes a closure assembly capable of movement into and out of covering relation to an aperture formed in the side walls of the tank means and further comprising a portion of the access means. A fluid tight seal is substantially defined by means of a seal means disposed adjacent or contiguous to the aperture and in engagement with the correspondingly positioned surface of the closure plate itself. Accordingly, when the closure plate is disposed in blocking relation to the aperture and in engagement with the seal means, fluid is prohibited from passing through the access. The closure plate is ideally formed of an opaque material so as to also prohibit the passage of light through the access means.

Each of the means themselves comprise a single tank including peripheral side walls connected to and extending from a base. The upper portion of each tank where the portion oppositely disposed from the base is open to atmosphere. A cover means dimensioned and configured in substantially corresponding relation to this opening is positionable on the tank so as to close off the opening and make the tank a substantially closed container. The cover means is ideally formed of an opaque material to prohibit the admission of light into the interior of the tank. In addition, positioning means comprising a first and second protrusion means are attached to or integrally formed in the side wall of on or more of each tank for the purpose of allowing screen or "flase bottoms" to be formed thereon. This has the advantage of allowing sediment and eggs to pass through the false bottom when so positioned and/or the provision of a screen cover to prevent the fish or other marine life from inadvertently escaping from the tank when the cover means is not properly positioned.

Strengthening means are also attached to or integrally formed on the exterior surface of the one or more tank means. These strengthening means are in the form of rib means arranged in substantially parallel spaced apart rib elements. Pairs of rib elements are disposed in substantially perpendicular relation to one another running parallel and transverse to the longitudinal axis of the tank means respectively. The strengthening means further serve as support means when the tanks are mounted on a supporting surface.

Another embodiment of the present invention comprises a supplementary container means mounted on the interior of at least one of the plurality of tank means and configured to at least partially enclose a substantially segregated portion of the interior of one or more of the tank means in which the supplementary container means is mounted. More specifically, this supplementary container is provided to separate the fry from adult breeders once the fry are delivered therefrom. This is accomplished through the provision of a supplementary container base having a plurality of troughs. The base itself has a generally corrugated configuration which again lends to facilitating natural separation of the fry once they are dropped from the live breeders. The fry then pass into a space immediately below the corrugated base of the supplementary container. This base is disposed in fluid communication to the access means allowing the fry to pass into the next connected tank.

Another structural feature of the present invention comprises a flow regulating means which helps determine or regulate the flow of marine life from one tank to another. This flow regulating means comprises a flow regulating conduit having a base and head portion which may be removably or integrally attached to one another. The head portion of the flow regulating conduit ideally comprises a substantially truncated, conical configuration wherein the exiting aperture of the head is of a substantially smaller diameter than the entering aperture of the flow regulating conduit. Because of the relatively small size of the exiting aperture, passage of the marine life back through this small aperture without appropriate funneling is extremely difficult. A collecting means in the form of a container or bag is attached to the flow regulating conduit about the opening of the bag. Ideally, the bag is translucent or transparent to allow passage of light therethrough. The disposition of the bag over the exiting aperture of the flow regulating conduit allows for easy collection of any marine life or fish passing through the flow regulating conduit into the collecting container.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a top plan view of the tank means selectively interconnected to one another to determine a preselected flow path of marine line contained within the various tank means.

FIG. 2 is a cross-sectional view of one of the tanks comprising the tank means as shown along line 2—2 of FIG. 1.

FIG. 3 is a partial cross-sectional view showing the cover and positioning means with various screen elements attached on the interior of one tank means.

FIG. 4 is a cross-sectional view showing disposition and the interior of a supplementary breeding container.

FIG. 5 is a partial cross-sectional view of interconnecting conduit means and flow regulating conduit means.

FIG. 6 is a bottom view of a single tank means disclosing disposition of the strengthening means formed thereon.

FIG. 7 is a partial cross-sectional view of a filtering and drain system associated with at least one of the tank means.

FIG. 8 is a top plan view of another embodiment of the present invention wherein the individual tank means are integrally connected to one another.

FIG. 9 is a sectional view taken along line 9—9 of FIG. 8 showing interconnecting conduit means.

Similar reference characters refer to similar parts throughout the several views of the drawings.

DETAILED DESCRIPTION

As shown in FIG. 1, the breeding facility of the present invention is generally indicated as 10 and comprises a plurality of tank means 12 wherein each tank means includes a single tank 14 through 19 as shown. While specifically six tanks are shown comprising the interconnected tank means, any number of preselected tanks can be interconnected dependent upon the breeding cycle or other similar factors affecting efficient breeding of a given species of marine life or tropical fish. Each tank comprises a base 20 surrounded by and attached to peripherally positioned side wall means 22. The top of the tank as represented in FIGS. 2, 3, 4 and 5 is open and specifically configured to receive a cover means 24. The cover means is substantially dimensioned and configured to correspond to the opening so as to removable fit thereon. The cover means 24 further is formed from an opaque material thereby prohibiting light from passing therethrough into the interior of the container. As clearly shown, peripheral side walls 22 may have their upper edge defined in an outwardly extending flange or lip 26 so as to mate with and allow support of cover means 24 by means of a correspondingly disposed and configured lip 28 on the cover means itself. Of course, other appropriate means for removably attaching the cover means 24 to the tank may be utilized.

Turning to FIG. 6, strengthening means in the form of a plurality of ribs 30 are integrally formed on the undersurface of one or more tanks 12 for the purpose of providing rigidity to the tank as well as means for mounting or supporting it on any given supporting surface. The ribs 30 are disposed in transverse relation to one another as clearly shown. Further, the rib elements may be arranged in pairs wherein each rib element of a given pair is arranged in substantially parallel spaced relation to the other rib element comprising the pair.

As stated above, each of the tank means 12 comprising the individual tank elements 14 through 19, or additional tank elements, are arranged in fluid communication with one another by means of interconnecting means generally indicated as 32 comprising an interconnecting conduit 34. This interconnecting conduit 34 is telescopically arranged relative to channel conduits 36 integrally formed on the side walls 22 of one or more of the tank means 12. The channel conduits 36 may comprise part of the access means generally indicated in FIG. 2 as 40. As set forth above, the main purpose of the interconnecting conduit, the channel conduit and the access means is to allow fluid communication and transfer of marine life or fish between the various adjacently positioned tanks. Further, the specific structural elements comprising the access means allows for regulation of flow of both water and/or marine life or fish from one tank to another as will be described in greater detail hereinafter. It should be noted that each tank means 12 may comprise one or a plurality of correspondingly positioned access means and attached interconnecting conduit. This allows for great versatility in arranging a preselected flow path of travel of the marine life in water through any number of tanks. With specific reference to FIG. 2, the access means comprises a closure plate 42 slidingly mounted on connectors 44. By virtue of this sliding mount, the plate 42 is capable of being positioned over channel 39 defined at least partially by channel conduit 36. This, of course, prevents flow of water or marine life through channel 39 and between the adjacently positioned and interconnected tanks of tank means 12. Ideally, closure plate 42 is formed of an opaque material so as to prohibit passage of light therethrough into the various channels unless the closure plate 42 is moved to the position indicated by directional arrows of 43. It should be further noted that a substantially fluid tight seal is formed by providing a seal means 46 disposed into engagement with the rear surface 47 of the closure plate 42 and adjacent or contiguous to the entrance to channel 39 at the junction of the interior of tank means 12 with channel 39.

With specific reference to FIG. 4, another embodiment of the present invention comprises a supplementary container means generally indicated as 50 utilized as a supplementary breeding container 52. The purpose of this supplementary tank is to position live breeders on the interior thereof 53. Upon dropping of the live fry, the fry are separated from the adult breeders by passing through elongated troughs 54 formed in the base 56. The base itself has a substantially corrugated configuration as shown so as to allow spaced apart relation between the individual troughs 54. Directional arrows 57 indicate the path of travel of the fry as they pass through the trough into a space 59 located between base 20 of tank means 12 and the base 56 of the supplementary container 52. Similarly, directional arrows 60 indicate the path of travel of the fry as they leave the interior 53 of the supplementary container 52 and pass through access means 40 including conduit 39 and interconnecting conduit 34 into an adjacently positioned and interconnected tank means 12. Adjustment means 62 comprises any applicable and/or conventional attachment elements capable of being mounted on the interior of the primary tank means 12 and attachable to supplementary container or tank means 50 so as to permit attachment of the supplementary container 52 from the interior of the primary tank means 12.

Referring again to both FIGS. 2 and 4, the base 20 of tank means 12 may be inclined so as to have its lowers point at one corner or one specified portion thereof. At this point, a drain opening 63 is thereby positioned so as to allow collection of the liquid or water contained in the tank and provide efficient means of emptying such water from the tank means 12 upon removal of stopper 64.

Yet another embodiment of the present invention comprises positioning means including a first protrusion means 66a and a second protrusion means 66b integrally formed in the side wall of at least one of the tank means 12. The purpose of the first and second protrusion means is to provide a supporting area or surface for a retainer screen 68 and an egg retention screen 69. Retainer screen 68 is provided to maintain all marine life and fish on the interior 70 of tank means 12 and prevent the fish from inadvertently jumping our of the tank if cover 24 is not in place.

A retention screen is provided to allow the eggs dropped from fish or other marine life to pass through the screen into the space 67 defined between screen 69 and base 20 of the tank means 12. This removes the eggs from the adult breeders and therefore prevents cannibalism or the adult fish from attacking the eggs.

Returning to FIG. 5, a flow regulating means is generally indicated as 72 and comprises base conduit 74 either removably or integrally attached to head 76. Head 76 is configured into a substantially truncated conical configuration such that aperture 78 is relatively smaller in dimension than the entrance aperture 79 disposed at the entrance of base conduit 74 of the flow regulating means. The entire base and head portions 74 and 76 may be referred to as a flow regulating conduit since marine life passes from one tank 15 to another tank 16 as indicated by directional arrows 80. The purpose of flow regulating conduit is to allow marine life to pass into the interior of tank 16 or any other appropriately positioned tank, in a single direction only. The relatively small size of aperture 78 prevents or severely limits the possibility of marine life passing back through aperture 78 in the opposite direction to that indicated by directional arrows 80.

A collector means 82 in the form of a translucent or transparent flexible bag-like container is attached by an elastic band, ring-type cable or the like 84 to the base conduit 74 of the flow regulator means 72. By virtue of this attachment and the disposition of container 82 relative to the flow regulating conduit means 72, marine life passing into the interior of container 82 is thereby readily collected upon the removal of container 82 since the marine life is essentially prohibited from passing back through the conduit due to the relatively small size of aperture 78 as set forth above.

With reference to FIG. 7, filtering systems may be employed directly into the individual tank means 12. These filtering systems may comprise a substantially conventional filtering element 87 interconnected by flexible conduit or tubing 89 to a level flow tube or overflow tube 90 as shown. Various apertures or openings 91 and 92 may be formed in the base or even side wall 22 of the various tank means 12 to appropriately mount and/or dispose the filter element 87 and overflow tube 90 relative to the liquid 93 or desired level thereof 94 within the interior of the tank means 12. Similarly, an overflow tube 96 interconnected in fluid communication to a drain tube 98 by stopper means 99 also mounted in base 20 may be provided on the interior of a tank means 12. The regulating means 100 may be removably attached to the top portion of overflow tube 96 so as to regulate the level 94 of water 93 contained in the tank means 12.

Yet another embodiment of the present invention comprises the individual tank element therein indicated as 14' through 19' being integrally connected to one another rather than removably attached as shown in FIG. 1.

FIG. 9 shows the interconnecting means 32' being integrally attached to side walls 22 of adjacently positioned tanks 14' and 15'. Again, similar access means can be mounted over the entrance and exit apertures to each of the tanks 14' and 15' respectively.

It will thus be seen that the objects made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language might be said to fall therebetween.

Now that the invention has been described, what is claimed is:

1. A breeding facility for marine life, said facility comprising: a plurality of tank means, at least two of said tank means disposed in successive, interconnected relation to one another; interconnecting means attached in fluid communicating relation between at least two of said plurality of tank means; access means mounted on at least one of said tank means and comprising an aperture formed in said one tank means in communcating relation to said interconnecting means, said access means further comprising a closure assembly positionable in flow interruptive position relative to said aperture, whereby a predetermined number of said plurality of tank means are arranged in fluid communicating relation to interconnect said plurality of tank means and define a predetermined flow path therebetween; flow regulating means connected to at least one access means in fluid communicating position relative to the interior and exterior of said one tank means, said flow regulating means comprising a flow regulating conduit including oppositely disposed apertures defined at the extremities of said flow regulating conduit, one of said oppositely disposed apertures positioned furthest from said access means having a substantially lesser diameter than the other of said oppositely disposed apertures, whereby flow of marine life in said tank means is regulated to flow through said conduit only in a single direction.

2. A breeding facility as in claim 1 further comprising cover means positionable over a major opening of said tank means, said cover means and said tank means formed from a non-light permeable material.

3. A breeding facility as in claim 1 wherein said plurality of tank means are removably connected to one another, whereby at least one of said plurality of tank means may be disconnected from the remainder of said plurality so as to redefine said predetermined flow path.

4. A breeding facility as in claim 1 wherein said interconnecting means comprises conduit means attached in fluid cmmunication to adjacently positioned tank means.

5. A breeding facility as in claim 1 wherein said conduit means comprises a substantially hollow conduit element having its opposite ends opened, said conduit element attached primarily on the exterior of said tank means and interconnected in fluid communicating relation between at least two of said plurality of tank means.

6. A breeding facility as in claim 1 wherein each of said plurality of tank means comprises at least two access means, each disposed on one of said plurality of tank means in corresponding relation to access means connected to adjacent, successively positioned tank means disposed both upstream and downstream of said one tank means.

7. A breeding facility as in claim 1 wherein at least three of said access means are mounted on at least two each of adjacently positioned tank means.

8. A breeding facility as in claim 1 wherein said closure assembly is movably connected to said access means and positionable between and open and closed relationship relative to said aperture.

9. A breeding facility as in claim 1 wherein said closure assembly further comprises at least one closure plate, seal means connected to said access means in engagement with said one closure plate whereby said one closure plate and said seal means define a substantially fluid tight seal preventing flow of fluid through said access means.

10. A breeding facility as in claim 9 wherein said closure plate is movably positionable in flow interruptive position relative to said aperture at least partially defining said access means.

11. A breeding facility as in claim 1 wherein said regulating conduit comprises a substantially truncated conical configuration.

12. A breeding facility as in claim 1 further comprising collecting means connected to one end of said fluid regulating conduit.

13. A breeding facility as in claim 12 further comprising said collecting means including a flexible container positionable at least partially below the level of water within said tank means on which said collecting means is attached.

14. A breeding facility as in claim 13 wherein said container means is formed from a light permeable material.

15. A breeding facility as in claim 1 wherein at least one of said tank means comprises base means, side wall means connected to said base means substantially about the periphery thereof and extending therefrom to an open peripheral boundary defining an opening to said tank means.

16. A breeding facility as in claim 15 wherein said base means is disposed at an inclined relation relative to the upper peripheral extremity of at least one of said tank means, said inclined disposition defining at least one portion of said base means disposed lower from the upper peripheral extremity of said one tank means and the remainder of said base means, whereby water in said tank means tends to collect at said one lower portion.

17. A breeding facility as in claim 16 further comprising a drain means disposed in said one lower portion of said base and disposed in fluid communication between the exterior and the interior of said one tank means.

18. A breeding facility as in claim 1 further comprising strengthening means including rib means connected to the outer surface of at least one of said plurality of tank means.

19. A breeding facility as in claim 18 wherein said rib means is disposed substantially parallel to the longitudinal axis of said one tank means and substantially transverse to said longitudinal axis.

20. A breeding facility as in claim 19 wherein said rib means comprises rib pairs, each pair arranged in substantially parallel relation to one another along the exterior of said longitudinal axis.

21. A breeding facility as in claim 1 wherein at least one of said tank means comprises positioning means disposed on the interior of said tank and disposed about the interior peripheral surface thereof in object supporting relation to said one tank means.

22. A breeding facility as in claim 20 wherein said positioning means comprises a first protrusion means extending from the interior surface of said one tank means and disposed about the periphery of said one tank means.

23. A breeding facility as in claim 22 wherein said positioning means further comprises a second protrusion means extending from the interior surface of said one tank means in spaced relation from said first protrusion means and in object supporting position about the periphery of said one tank means.

24. A breeding facility as in claim 1 further comprising supplementary container means mounted on the interior of at least one of said plurality of tank means and configured to at least partially enclose a substantially segregated portion of the interior of said one tank means.

25. A breeding facility as in claim 24 wherein said supplementary container comprises base means disposed in spaced relation to the base of said tank means, and passage means formed therein in fluid communicating relation between said one tank means and said supplementary container means.

26. A breeding facility as in claim 25 wherein said base comprises a substantially corrugated configuration and said passage means includes elongated channels disposed in interconnecting relation between the interior of said supplementary container and said one tank means.

27. A breeding facility as in claim 1 further comprising filter means disposed on at least one of said plurality of tank means in fluid communicating relation between said exterior and interior of said one tank means.

* * * * *